(12) United States Patent
Ishimoda

(10) Patent No.: US 11,294,167 B2
(45) Date of Patent: Apr. 5, 2022

(54) LOUPE AND LOUPE UNIT

(71) Applicant: Konica Minolta, Inc., Tokyo (JP)

(72) Inventor: Isao Ishimoda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 171 days.

(21) Appl. No.: 16/333,414

(22) PCT Filed: Sep. 25, 2017

(86) PCT No.: PCT/JP2017/034524
§ 371 (c)(1),
(2) Date: Mar. 14, 2019

(87) PCT Pub. No.: WO2018/066400
PCT Pub. Date: Apr. 12, 2018

(65) Prior Publication Data
US 2019/0250395 A1    Aug. 15, 2019

(30) Foreign Application Priority Data

Oct. 5, 2016  (JP) .............................. JP2016-197088

(51) Int. Cl.
*G02B 25/00* (2006.01)
*G02C 9/00* (2006.01)
(Continued)

(52) U.S. Cl.
CPC .......... *G02B 25/004* (2013.01); *C09J 155/02* (2013.01); *C09J 169/00* (2013.01); *C09J 175/04* (2013.01);
(Continued)

(58) Field of Classification Search
CPC .......... G02B 7/02; G02B 7/021; G02B 7/023; G02B 7/025; G02B 7/04; G02B 25/00;
(Continued)

(56) References Cited

U.S. PATENT DOCUMENTS 5,871,824 A * 2/1999 Bates .................... C04B 41/009
427/340
6,201,640 B1   3/2001 Caplan et al.
(Continued)

FOREIGN PATENT DOCUMENTS

| CN | 1608219 A | 4/2005 | |
|---|---|---|---|
| WO | 2007057987 A1 | 5/2007 | |
| WO | WO-2016182488 A1 * | 11/2016 | ............ G02B 7/002 |

OTHER PUBLICATIONS

International Preliminary Report on Patentability issued in corresponding application No. PCT/JP2017/034521 dated Apr. 9, 2019 (8 pages).
(Continued)

*Primary Examiner* — Jade R Chwasz
*Assistant Examiner* — Jyotsna V Dabbi
(74) *Attorney, Agent, or Firm* — Osha Bergman Watanabe & Burton LLP

(57) ABSTRACT

A loupe is bonded to a glasses-type holder to be worn around a head of a user. The loupe includes: a tube framework inserted into a hole or a cutout formed in the glasses-type holder and bonded with a UV adhesive; and a lens held in the tube framework. At least a portion at which the UV adhesive is applied in the tube framework is made of a resin not resistant to acetone and is covered with a paint resistant to acetone.

6 Claims, 5 Drawing Sheets

(51) Int. Cl.
*G02C 7/08* (2006.01)
*C09J 169/00* (2006.01)
*C09J 175/04* (2006.01)
*C09J 155/02* (2006.01)
*G02B 7/02* (2021.01)

(52) U.S. Cl.
CPC .............. *G02B 7/02* (2013.01); *G02B 25/00* (2013.01); *G02C 7/086* (2013.01); *G02C 9/00* (2013.01)

(58) Field of Classification Search
CPC .. G02B 25/002; G02B 25/004; G02B 25/005; G02B 25/008; G02C 9/00; G02C 9/04; G02C 7/08; G02C 7/086; G02C 7/088; C09J 169/00; C09J 175/04; C09J 155/02; C09D 175/04; C08L 51/08; C08G 2150/50; C08G 18/7671; C08G 18/755; C08G 18/73; C08G 18/42; C08G 18/48; C08G 18/6225; C08G 18/7621; C08G 18/7642; B32B 7/02; B32B 2323/00; B32B 2369/00

USPC ........................................................ 359/481
See application file for complete search history.

(56) References Cited

U.S. PATENT DOCUMENTS

| | | | |
|---|---|---|---|
| 2010/0214656 A1* | 8/2010 | Janik .................... | G02B 25/004 359/481 |
| 2010/0317875 A1* | 12/2010 | Sakano .................... | C07F 7/21 549/214 |
| 2012/0268837 A1* | 10/2012 | Rittenburg ............ | G09F 3/0288 359/742 |
| 2016/0109727 A1* | 4/2016 | Yang .................... | G02C 7/088 351/159.7 |
| 2018/0196282 A1* | 7/2018 | Yonezawa ............ | G02B 25/004 |

OTHER PUBLICATIONS

International Search Report issued in International Application No. PCT/JP2017/034524; dated Nov. 28, 2017 (2 pages).
Office Action issued in the counterpart Chinese Patent Application No. 201780060906.4, dated Nov. 16, 2020 (13 pages).

* cited by examiner

LOUPE AND LOUPE UNIT

CROSS-REFERENCE TO RELATED APPLICATIONS

This application is a U.S. national phase application filed under 35 U.S.C. § 371 of International Application No. PCT/JP2017/034524 filed on Sep. 25, 2017, which claims the priority to Japanese Patent Application No. 2016-197088 filed Oct. 5, 2016. Both applications are incorporated herein by reference in their entirety.

BACKGROUND

The present invention relates to a loupe and a loupe unit that can be favorably used, by, for example, medical doctors.

Glasses-type loupe units are known in medical fields. Medical users, such as surgeons and dentists, wear the glasses-type loupe units on their heads to observe the optically enlarged images of target sites for operations. Since two loupes must be individually provided for the right eye and the left eye in a binocular loupe unit, the user preliminarily adjusts the distance of each loupe to a target site such that the right and left visual fields match and then fixes the loupes to a glasses-type holder. A typical glasses-type holder has a shape that resembles glasses for eye correction and consists of a frame to be worn on the head of a user and transparent plates, corresponding to lenses, fixed to the frame, where the plates have no photorefractive effect in many cases.

In general, the loupes are fixed to the glasses-type holder after holes slightly larger than the outer diameter of the eye piece of the loupe are made in transparent plates, the right and left loupes are tilted such that the right and left visual fields match through the loupes in view of the distance between the right and left eyes of the user and the distance to the target, and then the peripheries of the eye pieces of the loupes are bonded to the peripheries of the holes of the plates with a UV adhesive. (see Patent Document 1). The UV adhesive, which is cured by irradiation with UV light, enables the processing time to be reduced compared to instant adhesives.

Patent Document

Patent Document 1: U.S. Pat. No. 6,201,640

Before the fixation of the loupes, the position of and the distance between the eyes of the user is preliminarily measured and the loupes are inserted into the holes of the transparent plates and tilted by a predetermined angle suitable for the user based on the measured information. The positions of the fixed loupes are not always aligned with the eyes of all the users. After the loupes are bonded to the glasses-type holder in actual cases, the glasses-type holder is worn on a user or medical doctor and then it is confirmed whether the right and left view fields are matched. If the readjustment of the positions of the loupes is necessary, the loupes are detached and the UV adhesive used in boding of the holes in the glass lenses to the loupes are completely removed to facilitate rebonding after readjustment.

In order to completely remove the solidified UV adhesive, acetone is often used as a stripper. Although the UV adhesive is effectively removed by acetone wiping, some resins are soluble in acetone. Adhesives less soluble in acetone (adhesive resistant to acetone) is thereby desirable for tube frameworks of loupes. However, limited types of materials are available. For example, poly (phenylene sulfide) (PPS) and poly(butylene phthalate) (PBT), which are resistant in acetone, has been used as materials for tube frameworks of loupes in some cases.

Since PPS and PBT have high water absorption, the dimensions of the adhesive readily vary over time, resulting in deterioration of the loupe performance due to deviation of the optical axis of the lenses. Since the loupes used in medical sites are cleaned with water and then sterilized after the use, these materials are unsuitable for the tube frameworks of the medical loupes. Furthermore, the molded products of PPS and PBT using molds have anisotropic shrinkage, i.e. different rates of shrinkage with the direction, and thus cannot be produced with high precision. Another disadvantage of PPS is low bonding strength in UV curable adhesives, resulting in insufficient holding force to the glass.

Polycarbonate (PC), which has low water absorption and low anisotropy, are highly demanded in tube frameworks in medical loupes. Since PC in general has low durability to acetone, tube frameworks made of PC is partially dissolved in acetone while a UV adhesive is removed with acetone. Tube frameworks made of acrylnitrile-butadiene-styrene copolymer (ABS) has the same disadvantage.

SUMMARY

One or more embodiments of the present invention provide a loupe and a loupe unit that less undergo aged deterioration and are resistant to acetone.

One or more embodiments of the present invention provide a loupe bonded to a glasses-type holder to be worn around a head of a user so that the user views an enlarged image of an object, the loupe including:

a tube framework inserted into a hole or a cutout formed in the glasses-type holder and bonded thereto with a UV adhesive; and a lens held in the tube framework, wherein at least a portion at which the UV adhesive is applied in the tube framework is made of a resin not durable to acetone and is covered with a paint durable to acetone.

One or more embodiments of the present invention provide a loupe and a loupe unit that exhibit less aged deterioration over time and high acetone resistance and can be readily readjusted.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

Figure 5:
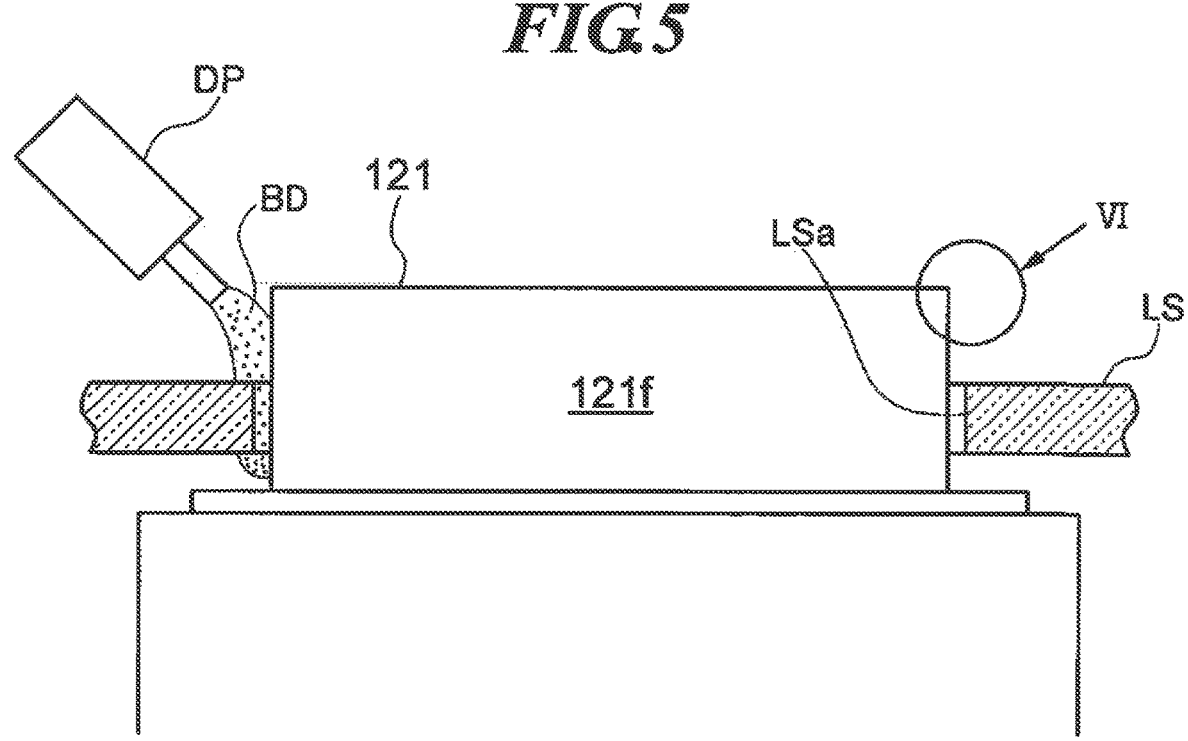
FIG. 5 is a cross-sectional view illustrating the step of applying a UV adhesive BD to the main static tube 121 inserted into the hole LSa of the glasses-type holder GL according to one or more embodiments.
Figure 6:
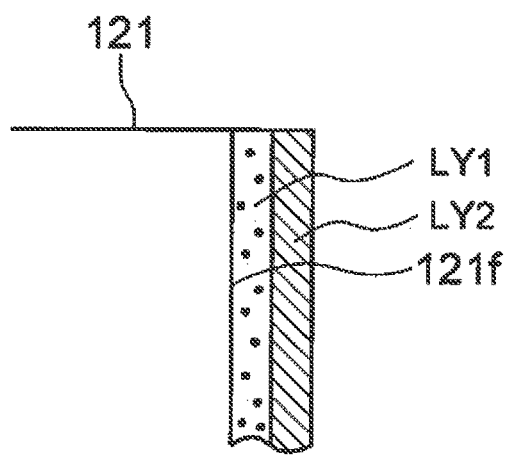

FIG. 6 is an enlarged view of a portion indicated by the arrow VI in FIG. 5.

Figure 7:
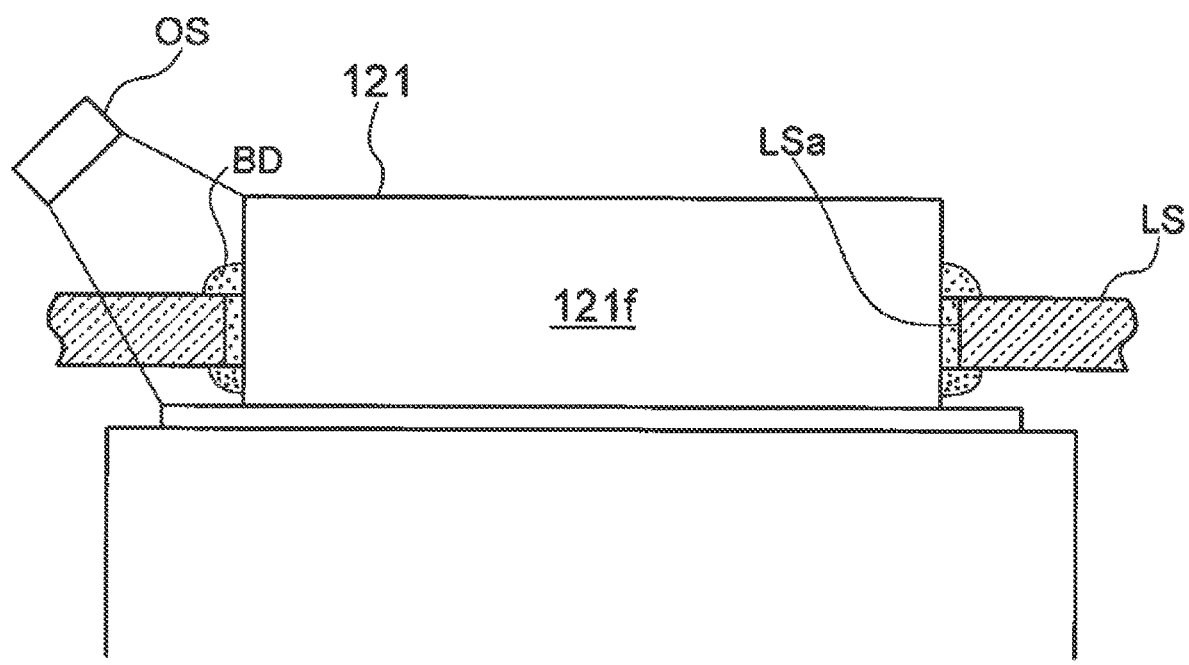

FIG. 7 is a cross-sectional view illustrating the step of hardening the UV adhesive BD applied onto the main static tube 121 inserted into the hole LSa of the glasses-type holder GL according to one or more embodiments.

DETAILED DESCRIPTION

Hereinafter, one or more embodiments of the present invention will be described with reference to the drawings. However, the scope of the invention is not limited to the disclosed embodiments.

Figure 1:
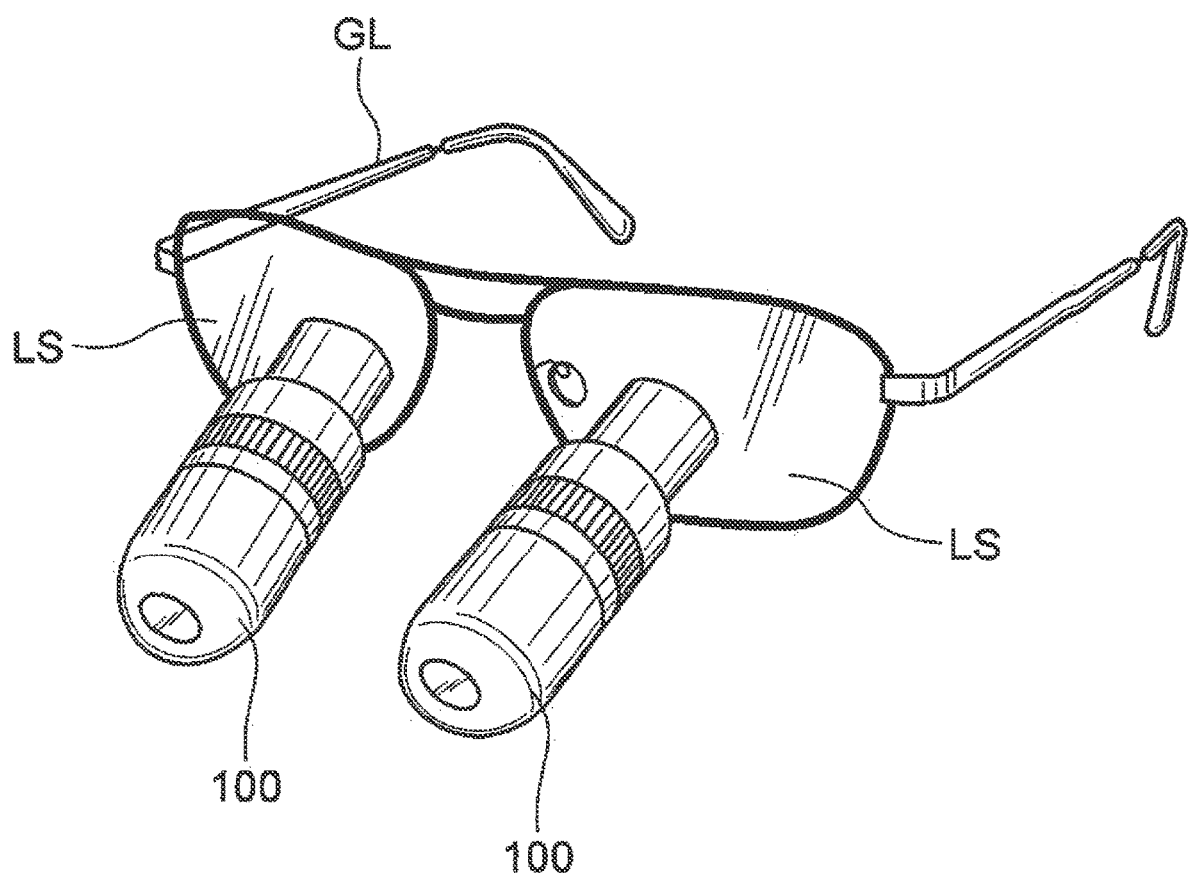
FIG. 1 is an isometric outline view of a loupe unit including loupes attached to a glasses-type holder according to one or more embodiments.

Embodiments of the present invention will now be described with reference to the accompanying drawings. FIG. 1 is an isometric outline view of a loupe unit including loupes attached to a glasses-type holder according to one or more embodiments.

As shown in FIG. 1, two loupes 100 are attached to the respective transparent plates LS of the glasses-type holder GL. The transparent plates LS are provided at positions corresponding to lenses of the glasses and have similar shapes to the lenses, but have not always refractive power. When a medical doctor wears the glasses-type holder GL on his/her face before the operation, the loupes 100 are disposed in front of the respective pupils. The doctor can observe an enlarged affected area. Since the two loupes 100 have the same structure, a single loupe 100 will be described below.

Figure 2:
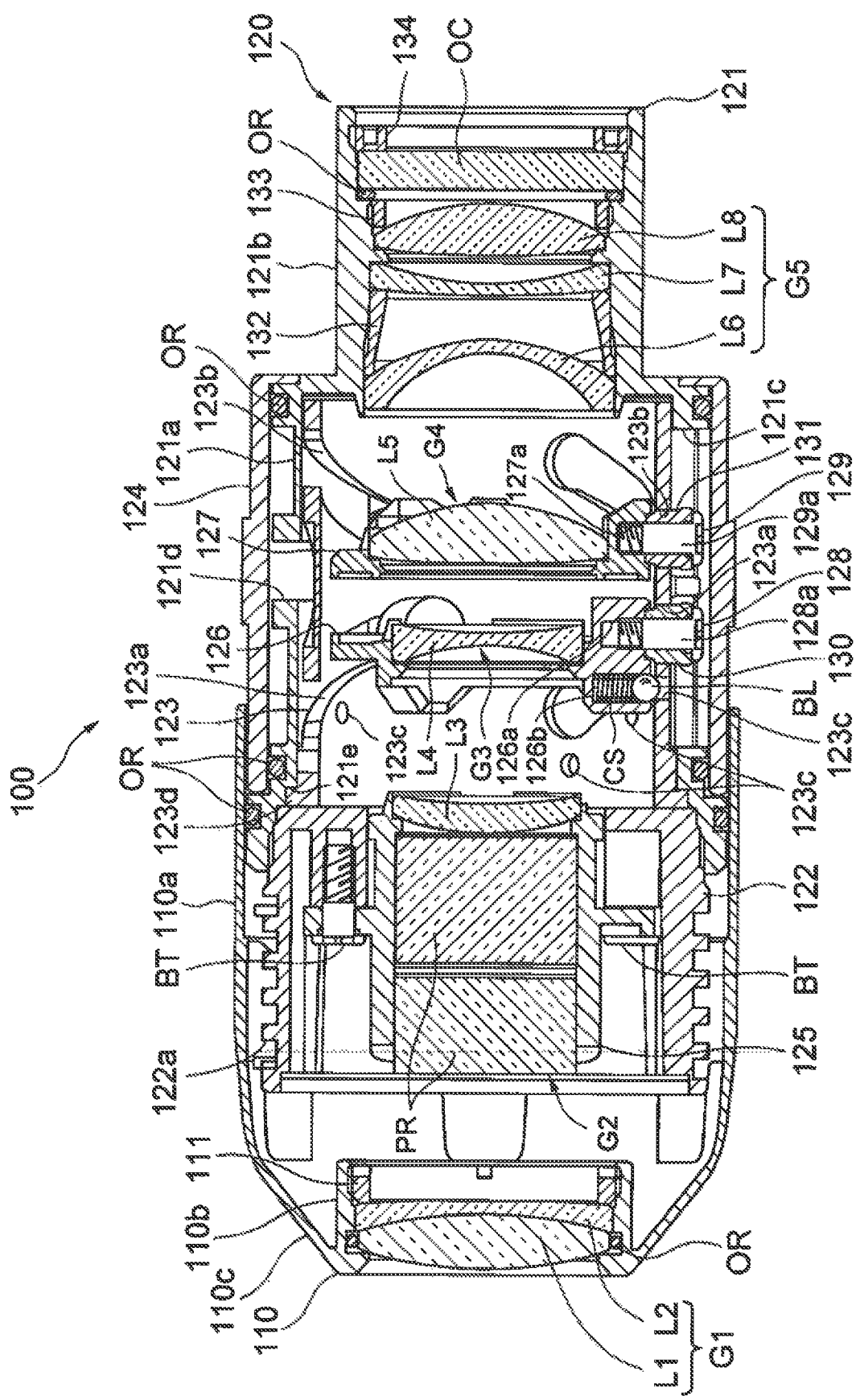
FIG. 2 is a cross-sectional view along the optical axis of a loupe 100 according to one or more embodiments.

FIG. 2 is a cross-sectional view along the optical axis of a loupe 100 according to one or more embodiments. The loupe 100 includes a spinning cylinder 110 and a static unit 120. The spinning cylinder 110 and the static unit 120 make up a tube framework. In the drawing, the thin metal spinning cylinder 110 consists of a large cylinder 110a, and a small cylinder 110b disposed thereinside, and a taper portion 110c that are integrated into one piece. A first lens group G1 of lenses L1 and L2 is disposed in the small cylinder 110b, and is fixed to the spinning cylinder 110 with an annular fixation 111. The lens L1 adjacent to the object is surrounded by an O-ring OR to ensure dust-tight and water-proof sealing to the small cylinder 110b.

The static unit 120 includes a main static tube 121, a cylindrical prism holder 122 that is connected to an object end of the main static tube 121, a cum cylinder 123 that is disposed inside the main static tube 121, and an operable ring 124 disposed outside the main static tube 121.

The cylindrical prism holder 122, which has a substantially cylindrical shape, holds a lens frame 125 that is fixed to the cylindrical prism holder 122 with bolts BT, where the lens frame 125 holds a Kepler prism PR generating an upright image and a lens L3. The prism PR and the lens L3 make up a second lens group G2. The cylindrical prism holder 122 has an outer face provided with a spiral groove 122a and is in contact with the leading end of an adjuster (not shown in the drawing).

A lens frame 126 holding a third lens group G3 being a lens L4 and a lens frame 127 holding a fourth lens group G4 being a lens L5 are disposed inside the cum cylinder 123 and are movable along the optical axis. The cum cylinder 123 has two circumferentially extending cum grooves 123a and 123b and circular openings 123c disposed at given intervals along the cum grooves 123a.

The lens frame 126 has three tapped holes 126a (only one hole is depicted in the drawing) on its outer periphery, and the end of a screw 128 having a cylindrical shaft 128a provided with a flange is installed into each of the tapped holes 126a. A turnable roller 130 is fit on a cylindrical shaft 128a and is fit on the scum groove 123a. The roller 130 can roll around the cum groove 123a of a cum cylinder 123.

A blind hole 126b is provided adjacent to one of the tapped holes 126a of the lens frame 126, and a coil spring CS and a ball BL are disposed in the blind hole 126b. The coil spring CS urges the ball BL radially outwardly. The position of the circular opening 123c corresponds to the position of the relatively rolling ball BL.

The end of a screw 129 having a flanged cylindrical axle 129a is screwed into each of the three screw holes 127a (only one hole is depicted in the drawing) provided on the periphery of the lens frame 127, a roller 131 fit onto the cylindrical axle 129a is inserted into the cum groove 123b and can roll on the cum groove 123b of a cum cylinder 123.

The main static tube 121 consists of a large cylinder 121a and a small cylinder 121b directly connected to each other. The main static tube 121 is formed by injection molding with a resin material not having acetone resistance in a mold. The term "material not having acetone resistance" refers to a material that is soluble in acetone. Examples of such a material include polycarbonates and ABS resins.

An end of the large cylinder 121a is connected to the cylindrical prism holder 122, and the inner face of the large cylinder has a linear groove 121c extending along the axis line. The heads of the screws 128 and 129 and the rollers 130 and 131 engage with the groove 121c so as to be relatively movable. The lens frames 126 and 127 can be shifted only along the linear groove 121c but cannot rotate.

The cum cylinder 123 is relatively rotatable inside the large cylinder 121a, and the operable ring 124 is relatively rotatable outside the large cylinder 121a. An opening (not shown) is provided in the center of the operable ring 124, and a screw (not shown) inserted into the opening extends through a circumferential groove 121d on the large cylinder 121a, is screwed onto the outer periphery of the cum cylinder 123, and puts the cum cylinder 123 into contact with the thick shaft portion. The operable ring 124 and the cum cylinder 123 rotates integrally while holding a predetermined space. Since a protruding portion 123d extending radially outwardly at the end of the cum cylinder 123 is accommodated in a cylindrical space defined between a circular dent 121e at the end of the large cylinder 121a and the end of the cylindrical prism holder 122, the cum cylinder 123 and the operable ring 124 cannot shift in the optical axis relative to the main static tube 121. The end of the large cylinder 110a of the spinning cylinder 110 surrounds the outer peripheries of the ends of the large cylinder 121a and the operable ring 124.

An O-ring OR is disposed between the spinning cylinder 110 and the large cylinder 121a, and other O-rings OR are disposed between the large cylinder 121a and the operable ring 124 at their ends, respectively. These O-rings seal the relevant components dust-tightly and water-tightly. An anti-skid straight knurl (not shown) with periodic grooves is formed on the outer periphery of the operable ring 124.

Lenses L6 and L7 of a fifth lens group G5 are fixed inside the small cylinder 121b of the main static tube 121 and separated by a cylindrical spacer 132, and a lens L8 is fixed inside the small cylinder 121b with a cylindrical fixation 133. An eye lens OC is fixed adjacent to the fifth lens group G5 with a ring fixation 134 inside the small cylinder 121b. An O-ring is disposed between the small cylinder 121b and the eye lens OC to seal these components dust-tightly and water-tightly.

The operation of the loupe unit according to one or more embodiments will now be explained. After a user wears the glasses-type holder GL on his head, he/she can observe an enlarged image of an object through the lens groups G1 to G5 in the loupe 100. The user can vary the magnification of the object image through rotation of the operable ring 124 accompanying the rotation of the cum cylinder 123. Although the screws 128 and 129 undergo rotary torque from the cum grooves 123a and 123b, the linear groove 121c blocks the rotation of these screws 123a and 123b. The user thus relatively moves the operable ring 124 along the cum grooves 123a and 123b and moves the lens frame 126 in one direction and the lens frame 127 in the opposite direction along the optical axis. Such an operation can vary the distance between the third lens group G3 and the fourth lens group G4 and thus vary the magnification. Every time the ball BL engages with one of the circular opening 123c, the user feels some resistance of the operation of the operable ring 124 at his/her fingers, in other words, click feeling, and thus can intuit a variable level of magnification.

Figure 3:
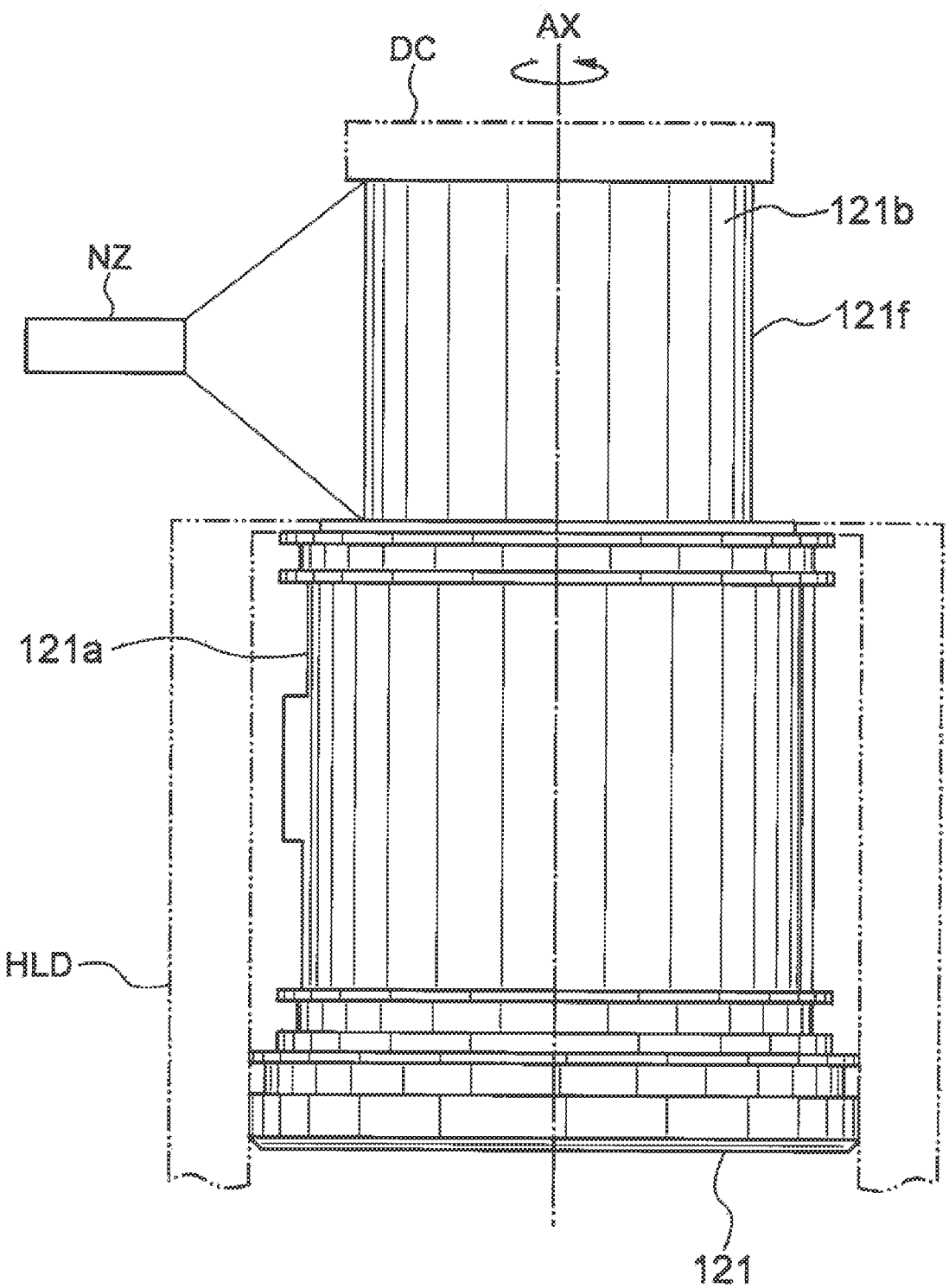
FIG. 3 illustrates the step of applying a predetermined coating onto a main static tube 121 according to one or more embodiments.
Figure 4:
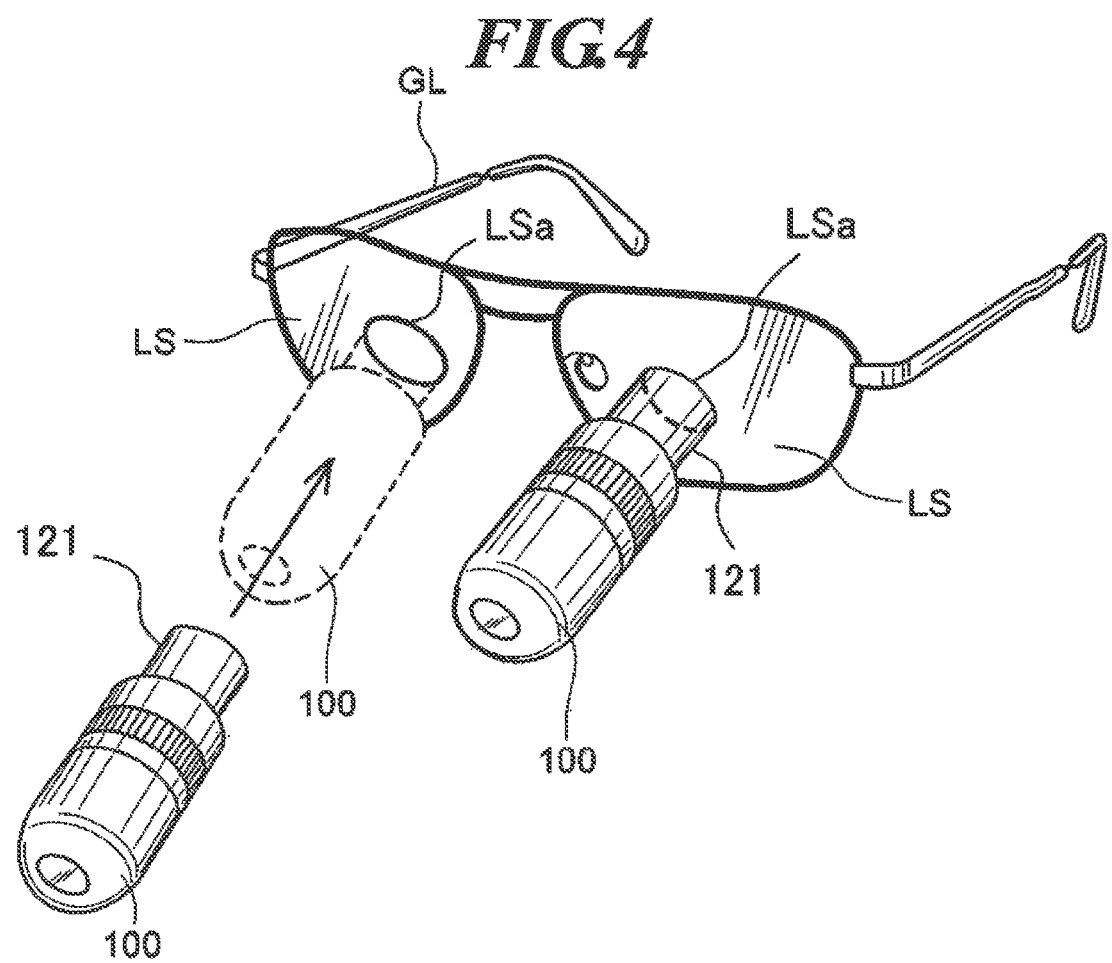
FIG. 4 is an isometric view illustrating insertion of the main static tube 121 of the loupe 100 into the hole LSa of the glasses-type holder GL according to one or more embodiments.

The step of bonding the loupe 100 to the glasses-type holder GL will now be described. FIG. 3 illustrates the step of applying a predetermined coating onto a main static tube 121. FIG. 4 is an isometric view illustrating insertion of the main static tube 121 of the loupe 100 into the hole LSa of the glasses-type holder GL. FIG. 5 a cross-sectional view illustrating the step of applying a UV adhesive BD to the main static tube 121 inserted into the hole LSa of the glasses-type holder GL. FIG. 6 is an enlarged view of a portion indicated by the arrow VI in FIG. 5. FIG. 7 is a cross-sectional view illustrating the step of hardening the UV adhesive BD applied onto the main static tube 121 inserted into the hole LSa of the glasses-type holder GL.

The main static tube 121 is formed by injection molding in a mold (not shown) with a low material, such as polycarbonate or ABS resin. A disk DC is mounted to an end of the molded main static tube 121 as shown in FIG. 3, and a cylindrical holder HLD holds the outer periphery of the large cylinder 121a. The disk DC and the cylindrical holder HLD function as masks in a painting process. Only the eyepiece outerface 121f of the small cylinder 121b in the main static tube 121 is exposed to the external space provided with a paint nozzle NZ. The cylindrical holder HLD can rotate around the axis AX while holding the main static tube 121.

A two-component acrylic urethane paint is sprayed onto the eyepiece outerface 121f from a facing nozzle NZ while the main static tube 121 supported by the holder HLD is being spun around the axis line AX. The two-component acrylic urethane paint is thereby applied into a uniform thickness on only the eyepiece outerface 121f.

Any two-component acrylic urethane paint having a solubility parameter similar to that of a vinyl acetate copolymer can be used. Examples of such a polymer include urethane crosslinked polymers of polyester polyols, polyether polyols, and acrylpolyols with isocyanate hardeners. Urethane crosslinked polymers of acrylic polyols with isocyanate hardeners may also be used. Any well known isocyanate hardening agent for a person skilled in the art can be used, for example, TDI, XDI, MDI, IPDI, and HMDI. An actual two-component acrylic urethane paint is "HAIUREX P" (trademark) available from Musashi Paint Holdings Co. Ltd.

The main static tube 121 is then maintained at a predetermined environmental temperature for a predetermined time while the disk DC and the holder HLD are not being detached to solidify the two-component acrylic urethane paint. After the hardening of the two-component acrylic urethane paint, afterheat is applied at a predetermined environmental temperature for a predetermined time, a resistant paint is sprayed onto the eyepiece outerface 121f shown in FIG. 3 from another facing nozzle NZ while the main static tube 121 supported by the holder HLD is being spun around the axis line AX. A resistant paint is thereby applied onto only the eyepiece outerface 121f into a uniform thickness.

The resistant paint has durability to acetone after the hardening. The material "having durability to acetone" is a material that is less soluble or completely insoluble in acetone. The material that is "less soluble in acetone" is a material, such as polycarbonate or ABS resin, lesser soluble than materials for tube frameworks when the material is immersed in acetone under the same condition. Examples of such paints include phenol resin paints and fluorinated resin paints. For example, UV paints curable by UV irradiation can also be used provided that the paints are less soluble in acetone. In one or more embodiments, UV paints resistant to acetone is used.

Examples of the UV paint include unsaturated polyester resin paints containing unsaturated polyester resins and photopolymerization initiators in styrene and acrylic UV paints containing a mixture of acrylic oligomers and acrylic prepolymer and photopolymerization initiators. When the UV paint is irradiated with UV light, the photopolymerization initiators absorbs the UV light to be converted into radicals that effect on the acrylic oligomer and the acrylic prepolymer to harden the liquid paint through radical polymerization reaction. A typical example of the acetone-resistant UV paints is "ULTRA VIN" (trade name) available from Musashi Paint Holdings Co. Ltd.

After application with the UV paint, the eyepiece outerface 121f of the main static tube 121 is irradiated with UV light for a predetermined time to harden the UV paint. As shown in FIG. 6, a layer LY1 of the two-component acrylic urethane paint is formed on the outer periphery of the eyepiece outerface 121f, and a UV paint layer LY2 is formed thereon. The layer LY2 of the two-component acrylic urethane paint can increase the adhesiveness of the UV paint layer LY1. If only the UV paint layer LY2 is formed on the surface of the main static tube 121, the gloss is too high to maintain the quality of the product. However, the layer LY1 of the two-component acrylic urethane paint provided therebetween has matte effects and thus enhances the quality of the product. Alternatively, the resistant paint may be directly applied onto the periphery of the eyepiece outerface 121f, or on the entire surface of the main static tube 121.

The resulting main static tube 121 is assembled with other components to produce a loupe 100. The loupe 100 is mounted to the glasses-type holder GL, as shown in FIG. 4.

In detail, with reference to FIG. 5, the main static tube 121 of the loupe 100 is inserted into the hole LSa of the transparent plate LS, the optical axis of the loupe 100 is tilted by a predetermined angle from the transparent plate LS, and then a UV adhesive BD is applied from the dispenser DP between the eyepiece outerface 121f of the main static tube 121 and the hole LSa over the entire periphery.

The UV adhesive BD can be hardened within a short time range by the energy of the UV rays emitted from the UV emitter. A typical example of the UV adhesive is Loctite (tradename) available from Henkel Corp.

With reference to FIG. 7, after application of the UV adhesive BD, the eyepiece outerface 121f of the main static tube 121 is irradiated with UV light from the light source OS for a predetermined time to harden the UV adhesive BD. With reference to FIG. 6, the periphery of the eyepiece outerface 121f and the hole LSa are tightly bonded, not causing detachment of the loupe 100 when a user wears the glasses-type holder GL.

If any defect occurs, for example, if the positions of user's eyes are misaligned after the loupe 100 is attached to the transparent plate LS, the loupe 100 is forced to be separated from the transparent plate LS to readjust the angle of the loupe 100 to the transparent plate LS. After the loupe 100 is separated from the glasses-type holder GL, the UV adhesive BD still remains on the periphery of the eyepiece outerface 121f of the loupe 100 in many cases. The remaining adhesive precludes rebonding of the loupe 100 and the adhesive remaining on the outer face impairs the appearance. Hence, the UV adhesive BD remaining of the periphery of the eyepiece outerface 121f is removed with acetone. The loupe 100 is then bonded to a new transparent plate LS. After adjustment of the right and left visual fields, the loupes 100 are reattached to the glasses-type holder GL with the UV adhesive BD.

As shown in FIG. 6, the layer LY1 of the two-component acrylic urethane paint is formed on the periphery of the eyepiece outerface 121f and the UV paint layer LY2 is then formed therearound in one or more embodiments. Even if the main static tube 121 is made of a material that is not resistant to acetone, the main static tube 121 is not damaged by acetone used for removal of the UV adhesive BD.

It is apparent from embodiments and technical concept described in the specification for a person skilled in the art that the embodiments described in the specification should not be construed to limit the scope of the present invention and should include any other embodiments and variation. The description and embodiments described in the specification are for illustrative purposes and the scope of the present invention is described in Claims. For example, the holes provided in the glasses-type holder may be replaced with cutouts to which loupes 100 are bonded.

As described above, the loupe and the loupe unit of one or more embodiments of the present invention can be applied when a user observes an object.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 100 loupe
110 spinning cylinder
110a large cylinder
110b small cylinder
110c taper portion
111 fixation
120 static unit
121 main static tube
121a large cylinder
121b small cylinder
121c linear groove
121d circumferential groove
121e circular dent
121f eyepiece outerface
122 cylindrical prism holder
122a spiral groove
123 cum cylinder
123a cum groove
123b cum groove
123c circular opening
123d protruding portion
124 operable ring
125 lens frame
126 lens frame
126a hole
126b blind hole
127 lens frame
127a hole
128 screw
128a cylindrical shaft
129 screw
129a cylindrical shaft
130,131 rollers
132 cylindrical spacer
133 cylindrical fixation
134 ring fixation
AX axial line
BD adhesive
BL ball
BT bolt
CS coil spring
DC disk
DP dispenser
G1-G5 lens groups
GL glasses-type holder
HLD cylindrical holder
L1-L8 lenses
LS transparent plate
LSa hole
LY1 paint layer
LY2 paint layer
NZ nozzle
OC eye lens
OR O-ring
OS light source
PR prism

The invention claimed is:

1. A magnifying loupe bonded to a glasses-type holder to be worn around a head of a user, the magnifying loupe comprising:
a tube framework that is detachably bonded to a transparent plate of the glasses-type holder and that comprises:
a spinning cylinder; and
a static fixture that comprises:
a first cylinder that holds at least two lenses relatively movable in an optical axis direction to vary a distance between the lenses and vary magnification; and
a second cylinder that:
holds an eye lens,
has a smaller diameter than the first cylinder and is connected to the first cylinder, and
is inserted into a hole or a cutout formed in the transparent plate and bonded to the transparent plate with a UV adhesive, wherein
the UV adhesive is soluble in acetone,
the second cylinder is made of resin that is soluble in acetone,
an outer face of the second cylinder is covered with paint that is insoluble in acetone.

2. The magnifying loupe according to claim 1, wherein the second cylinder is made of a polycarbonate or an ABS (acrylnitrile-butadiene-styrene copolymer) resin.

3. The magnifying loupe according to claim 1, wherein a two-component acrylic urethane paint is applied between the outer face of the second cylinder and the paint.

4. A magnifying loupe unit comprising:
   the magnifying loupe according to claim 1; and
   the glasses-type holder with the transparent plate having the hole or the cutout, wherein
   the second cylinder of the magnifying loupe is inserted into the hole or the cutout and is bonded to the transparent plate with the UV adhesive, and
   the glasses-type holder is worn around the head of the user.

5. The magnifying loupe according to claim 1, wherein the paint is at least one of:
   a phenol resin paint;
   a fluorinated resin paint;
   an unsaturated polyester resin UV paint; and
   an acrylic UV paint.

6. A manufacturing method of a loupe unit, comprising:
   preparing a loupe that comprises:
      a lens; and
      a tube framework that holds the lens and that is made of resin soluble in acetone, wherein at least part of an outer face of the tube framework is covered with paint insoluble in acetone;
   preparing a glasses-type holder that comprises a transparent plate having a hole or a cutout; and
   after adjusting an angle of the tube framework inserted into the hole or the cutoff, bonding the tube framework to the transparent plate with UV adhesive soluble in acetone, wherein
   the manufacturing method further comprises:
      when an angle adjustment is inadequate, removing the loupe from the transparent plate;
      cleaning the outer surface of the loupe with acetone to remove the UV adhesive; and
      after readjusting the angle of the tube framework inserted into the hole or the cutoff, bonding the tube framework to the transparent plate with the UV adhesive soluble in acetone.

\* \* \* \* \*